(12) United States Patent
Coveley et al.

(10) Patent No.: US 6,873,620 B1
(45) Date of Patent: Mar. 29, 2005

(54) COMMUNICATION SERVER INCLUDING VIRTUAL GATEWAY TO PERFORM PROTOCOL CONVERSION AND COMMUNICATION SYSTEM INCORPORATING THE SAME

(75) Inventors: Michael Coveley, Richmond Hill (CA); Srdjan Milutinovic, Brampton (CA)

(73) Assignees: Solbyung Coveley, Richmond Hill (CA); cStar Technologies, Inc., Toronto (CA)

( * ) Notice: Subject to any disclaimer, the term of this patent is extended or adjusted under 35 U.S.C. 154(b) by 0 days.

(21) Appl. No.: 09/367,670

(22) PCT Filed: Dec. 18, 1998

(86) PCT No.: PCT/CA98/01146
§ 371 (c)(1),
(2), (4) Date: Oct. 18, 1999

(87) PCT Pub. No.: WO99/33226
PCT Pub. Date: Jul. 1, 1999

(30) Foreign Application Priority Data
Dec. 18, 1997 (CA) .............................................. 2225227

(51) Int. Cl.[7] .............................................. H04L 12/28
(52) U.S. Cl. .................... 370/395.31; 370/466; 370/474
(58) Field of Search .............................. 370/310–310.2, 370/312, 313, 328, 395.1, 395.2, 395.3, 395.31, 464–466, 474, 431, 432, 463, 542, 543, 544; 375/295, 298, 308, 329

(56) References Cited

U.S. PATENT DOCUMENTS

| | | | | |
|---|---|---|---|---|
| 4,999,833 A | | 3/1991 | Lee | |
| 5,682,460 A | | 10/1997 | Hyziak et al. | |
| 5,809,028 A | * | 9/1998 | Nethercott et al. | 370/467 |
| 5,894,478 A | * | 4/1999 | Barzegar et al. | 370/401 |
| 5,970,488 A | * | 10/1999 | Crowe et al. | 707/8 |
| 5,978,672 A | * | 11/1999 | Hartmaier et al. | 455/413 |
| 6,075,796 A | * | 6/2000 | Katseff et al. | 370/466 |
| 6,151,390 A | * | 11/2000 | Volftsun et al. | 370/522 |
| 6,157,950 A | * | 12/2000 | Krishnan | 709/223 |
| 6,278,697 B1 | * | 8/2001 | Brody et al. | 370/310 |
| 6,295,297 B1 | * | 9/2001 | Lee | 370/395.61 |
| 6,414,952 B2 | * | 7/2002 | Foley | 370/352 |

FOREIGN PATENT DOCUMENTS

| | | |
|---|---|---|
| EP | 0 748 064 A2 | 12/1996 |
| EP | 0 777 394 A1 | 6/1997 |
| WO | WO 97/01940 | 1/1997 |
| WO | WO 97/32439 | 9/1997 |

* cited by examiner

Primary Examiner—Hassan Kizou
Assistant Examiner—David Odland
(74) Attorney, Agent, or Firm—Baker & Daniels

(57) ABSTRACT

A communication system (10) comprises at least two communication networks (20, 22) over which communications between physical devices (14) connected to the communication networks are to be carried out. The communication networks (20, 22) implement different protocols for messaging. A communication server (12) acts between the communication networks. Messages between the communication networks pass through the communication server. The communication server includes a knowledge base (286) storing protocol conversion information. The communication server (12) accesses the protocol conversion information in the knowledge base (286) upon receipt of a message and converts the protocol thereof to a protocol compatible with the communication network to which the message is being sent.

44 Claims, 15 Drawing Sheets

COMMUNICATION SERVER INCLUDING VIRTUAL GATEWAY TO PERFORM PROTOCOL CONVERSION AND COMMUNICATION SYSTEM INCORPORATING THE SAME

TECHNICAL FIELD

The present invention relates to communication systems and in particular to an intelligent communication server to enhance communications connectivity in wireless and/or land-line networks and to a communication system incorporating the same.

BACKGROUND ART

In today's communications environment, users on different networks must communicate with each other. This makes internetworking among various telecommunications networks an important and challenging technological task. The majority of current interconnected telecommunication networks provide support only for selected applications. It is of course desired that interconnected telecommunication networks support virtually all applications. Difficulties in communications connectivity between applications on wireless networks and host computers on land-line wired networks has been of concern. Also, the growth of existing services and the introduction of new services on communication networks has significantly increased traffic flow. In heterogeneous wired and wireless networks, communication servers must be able to cope with capacity and network failures while being cost efficient. Accordingly, communication servers which provide flexible communications connectivity between participants are desired.

It is therefore an object of the present invention to provide a novel communication server to enhance communications connectivity in wireless and/or land-line networks and to provide a novel communication system incorporating the same.

DISCLOSURE OF THE INVENTION

According to one aspect of the present invention there is provided a communication system comprising:

at least two communication networks over which communications between physical devices connected to said communication networks are to be carried, said communication networks implementing different protocols for messaging; and a communication server acting between said communication networks and through which messages transmitted between said communication networks pass, said communication server including a knowledge base storing protocol conversion information, said communication server accessing said protocol conversion information in said knowledge base upon receipt of a message and converting the protocol thereof to a protocol compatible with the communication network to which said message is being sent.

Preferably, the communication server includes virtual devices communicating with the communication networks and a virtual gateway bridging the virtual networks. The virtual gateway accesses the knowledge base and converts protocols of the messages. Preferably, the virtual gateway includes a preprocessor, a processor and a postprocessor. The preprocessor examines each incoming message to locate target logical connection information determining the target destination for the incoming message. The processor converts the protocol of each incoming message, where appropriate, based on the target logical connection information. The postprocessor wraps each message received from the processor with headers, where appropriate.

In a preferred embodiment, one of the communication networks is a wireless network and another of the communication networks is a wired land-line network. Messages transmitted over the wireless network include API messages to be processed by destination physical devices and target logical connection information specifying the destinations for the API messages. The target logical connection information is included in a logical message header wrapping the API messages. Preferably, the preprocessor in the virtual gateway strips the logical message header from the API message upon receipt of a message from a wireless network and uses the logical message header as a key to search the knowledge base for the protocol conversion information. If the preprocessor is unable to obtain the target logical connection information from the logical message header, the preprocessor analyzes the API message of the message received from the wireless network for the target logical connection information.

According to another aspect of the present invention there is provided a communication server to act as a gateway for the transmission of messages between two devices communicating with networks implementing different protocols, said communication server comprising:

a knowledge base storing protocol conversion information to convert messages of one protocol to a different protocol; and a virtual gateway accessing said protocol conversion information upon receipt of a message to be transmitted between said devices and converting the protocol of said message to a protocol compatible with the network to which said message is being sent.

In still yet another aspect of the present invention there is provided a communication system comprising:

a wireless network;

at least one wireless terminal to transmit messages over said wireless network;

a land-line network;

at least one host computer connected to said land-line network to transmit messages over said land-line network; and a communication server providing communications connectivity for messages to be transmitted from one network to the other, wherein said at least one wireless terminal and said communication server include registries, said registries including mapping information to map physically said at least one wireless terminal to said land-line network to enable messages transmitted by said at least one wireless terminal to be delivered to said at least one host computer.

The present invention provides advantages in that communications connectivity between physical devices on a wireless network and physical devices on a land-line network is maintained even though the API data of physical devices may not provide for direct communications connectivity. In addition, the present invention provides advantages in that the communication server includes a knowledge base to deal with "special" communication protocol conditions as they arise.

BRIEF DESCRIPTION OF THE DRAWINGS

An embodiment of the present will now be described more fully with reference to the accompanying drawings in which.

BEST MODE FOR CARRYING OUT THE INVENTION

In the well known OSI Reference Model, every device that connects two computer systems or networks, that are not connected to each other, is referred to as a relay. In accordance with this terminology, a bridge functions as a data link layer relay. A router represents a network layer relay, and a gateway is any relay at a layer that is higher than the network layer. Nonhomogenity and a broad variety of differences between interconnected networks needs to be resolved by numerous functions performed by these relays in order to achieve connectivity. Some of those tasks to be resolved are: a) routing techniques; b) error control; c) flow control; d) user access control; e) close procedures; f) communication monitoring and traffic handling; g) statistics; and h) network efficiency to name but a few. The present invention relates to a communication server, which provides communications connectivity between wireless and/or land-line networks.

Figure 1:
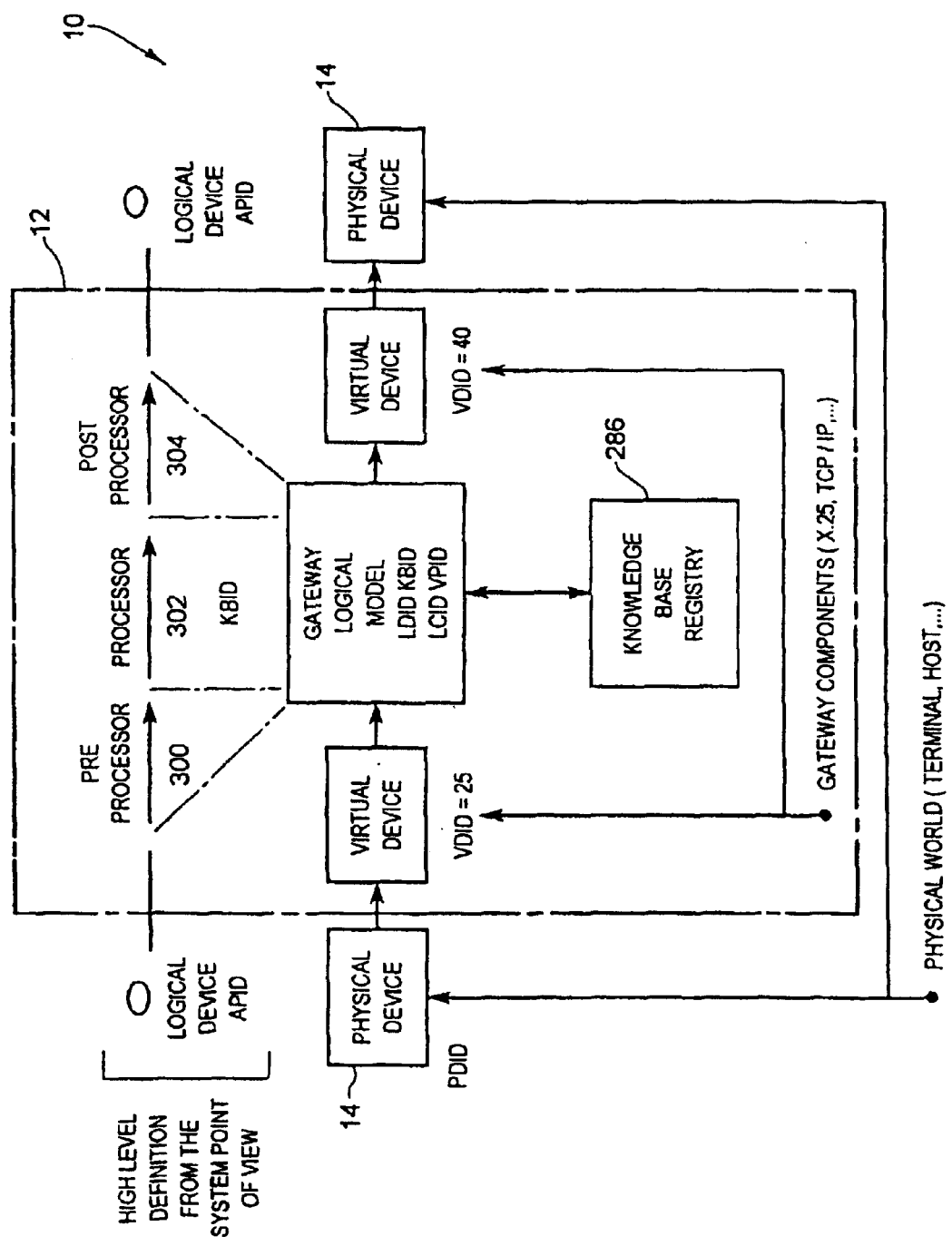
FIG. 1 is a schematic block diagram of a communication systems including a communication server in accordance with the present invention.
Figure 2:
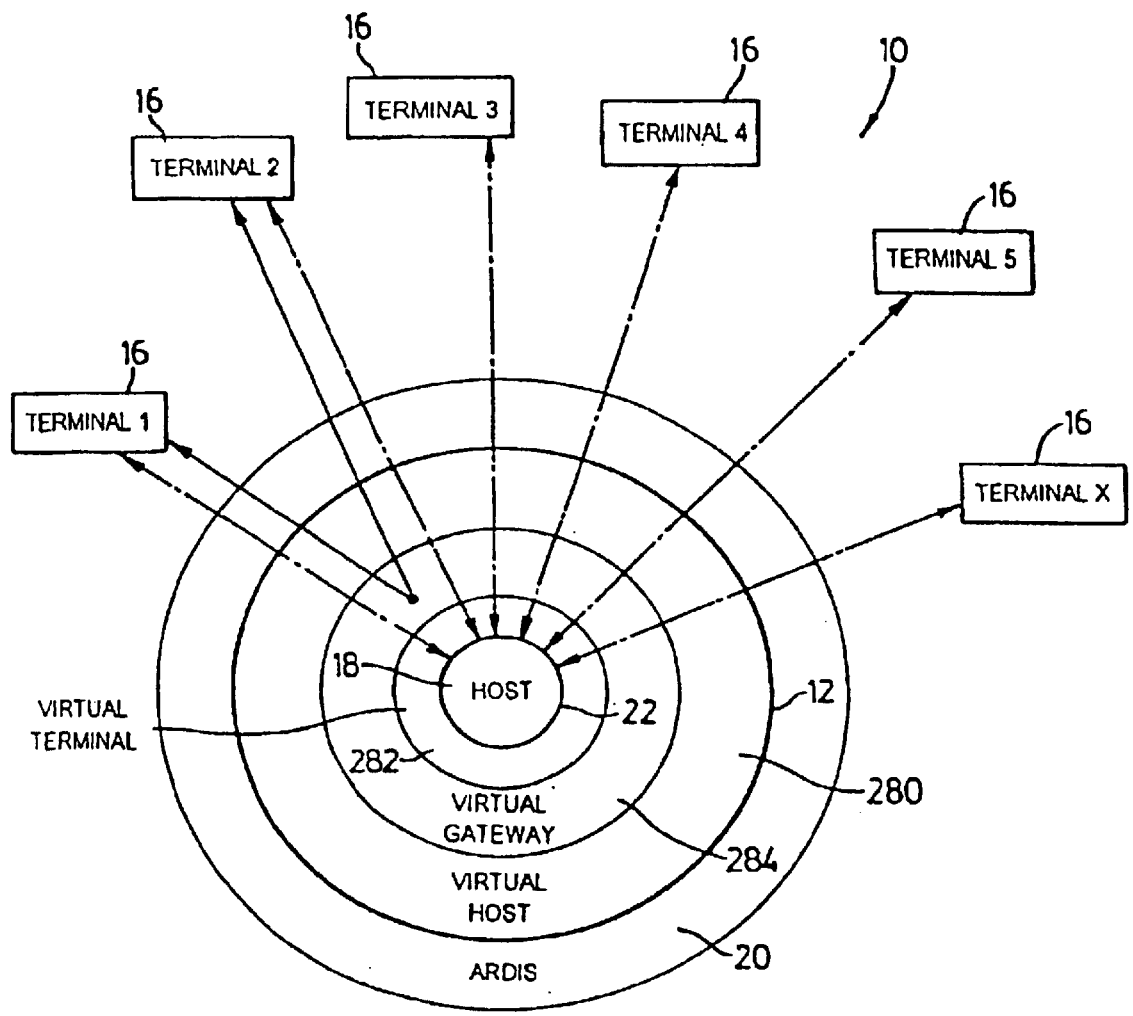
FIG. 2 illustrates the network infrastructure of the communication system of FIG. 1.

Turning now to FIGS. 1 and 2, a communication system in accordance with the present invention is shown and is generally indicated to by reference numeral 10. As can be, seen, communication system 10 includes a communication server 12 communicating with physical devices 14. The physical devices 14 include wireless terminals 16 such as point-of sale terminals or the like as well as host computers 18. The wireless terminals 16 communicate with the communication server 12 over a wireless packet data network (WPDN) 20. In this particular example, the WPDN is a DataTAC (ARDIS) based network. The host computers 18 communicate with the communication server 12 over land-line based networks 22 such as for example, X.25 and TCP/IP protocol based networks.

Figure 3:
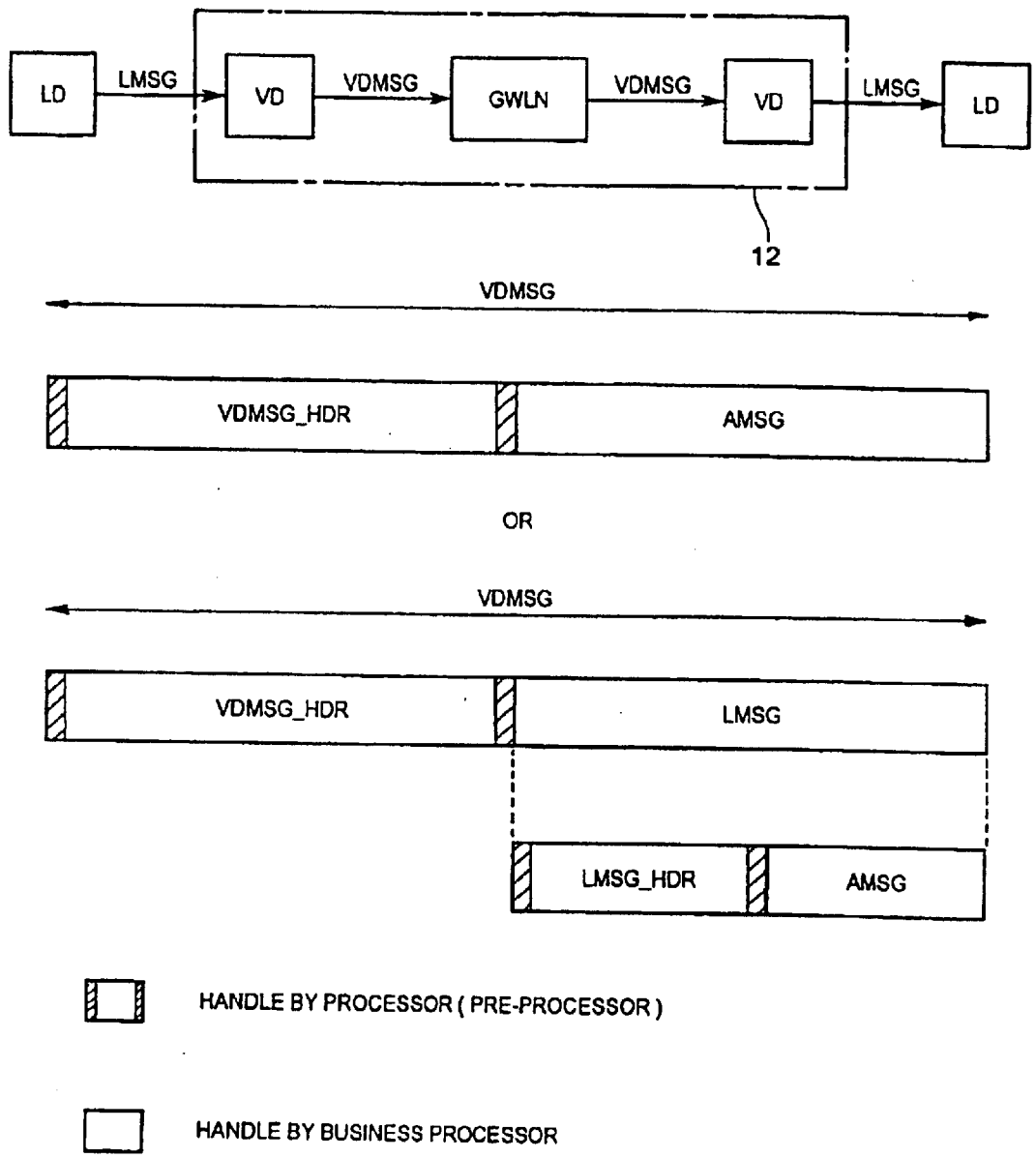
FIG. 3 illustrates message structure in the communication system of FIG. 1.

During communications between communicating physical devices 14 in the communication system 10, application (API) messages AMSGs are exchanged between the physical devices for processing. On the wireless network side, the API messages AMSGs are transmitted as logical messages LMSGs. The logical messages include the API messages to be processed as well as destination information for the API messages. In this manner, the communication server 12 can determine the desired destination of the API messages as well as their required form when passed to the desired destination. Specifically, API messages AMSGs transmitted over the WPDN 20 are wrapped with virtual device message headers VDMSG_HDRs and with logical message headers VMSG_HDRs. API messages AMSGs transmitted over the land-line network 22 are not wrapped. Although not shown, API messages AMSGs may also be wrapped only by virtual device message headers VDMSG_HDRs. FIG. 3 shows wrapped API message AMSGs. The communication server 12, which receives all API messages transmitted between physical devices 14, unwraps and wraps API messages and performs API message protocol conversion, when required, thereby to provide communications connectivity between the physical devices 14.

The wireless terminals 16 follow a logical model consistent with the communication server 12. The host computers 18 on the other hand do not follow the logical model followed by the wireless terminals 16 and communication server 12. Thus, Audi communications through the communication server 12, between a wireless terminal 16 and a host computer 18, are based on communications between a "known application" and an "unknown host". "Unknown" in the context of the present application refers to the fact that the communication server 12 only knows the basic API levels of the host computers 18. Since the host computers 18 are typically managed by third party institutions, there is little that can be done to change their API levels to allow them to communicate directly with the wireless terminals 16. Therefore, this poses a potential communications problem especially when a message is transmitted from a host computer 18 that is to be delivered to a wireless terminal 16.

According to Tanenbaum, every communication entity within a communications environment has to be identified in order to establish communications with other entities. Three terms that are applicable to this concept are names, addresses, and routes. The important step in this concept is the logical address which leads to the concept of an API logical message generated on an API level.

In the present communications system 10, the above-identified potential communications problem between host computers 18 and wireless terminals 16 is overcome by the communication server 22 which wraps and unwraps API messages as required to establish two way logical communications between the host computers 18 and wireless terminals 16.

To achieve communications in the communication system 10, physical devices 14 taking part in the communications require unique logical addresses. Each logical address comprises three identification levels (IDs), namely a system ID, an application ID and a component ID. The general format for the logical address is:

System ID. Application ID. Component ID.

The system IDs identify systems within the logical model. The length of the system ID (i.e. its number of bytes) depends on inputs and designates many of the systems. The application IDs identify the logical units within the communication system 10, including the wireless terminals 16, the communication server 12 and the host computers 18. Basically all participants in the communication system 10 are assigned an application ID. This is an abstract definition, which does not care about physical connections. The component IDs identify all components within the logical units such as drivers, communication managers, bank credit components, bank debit components, etc.

The logical model enables logical connectivity among everything participating in communications over the communication system 10. It is important to note that this connectivity is not physical connectivity. This is API logical connectivity established in order to enable API messages to flow freely over the communication system.

Figure 4:
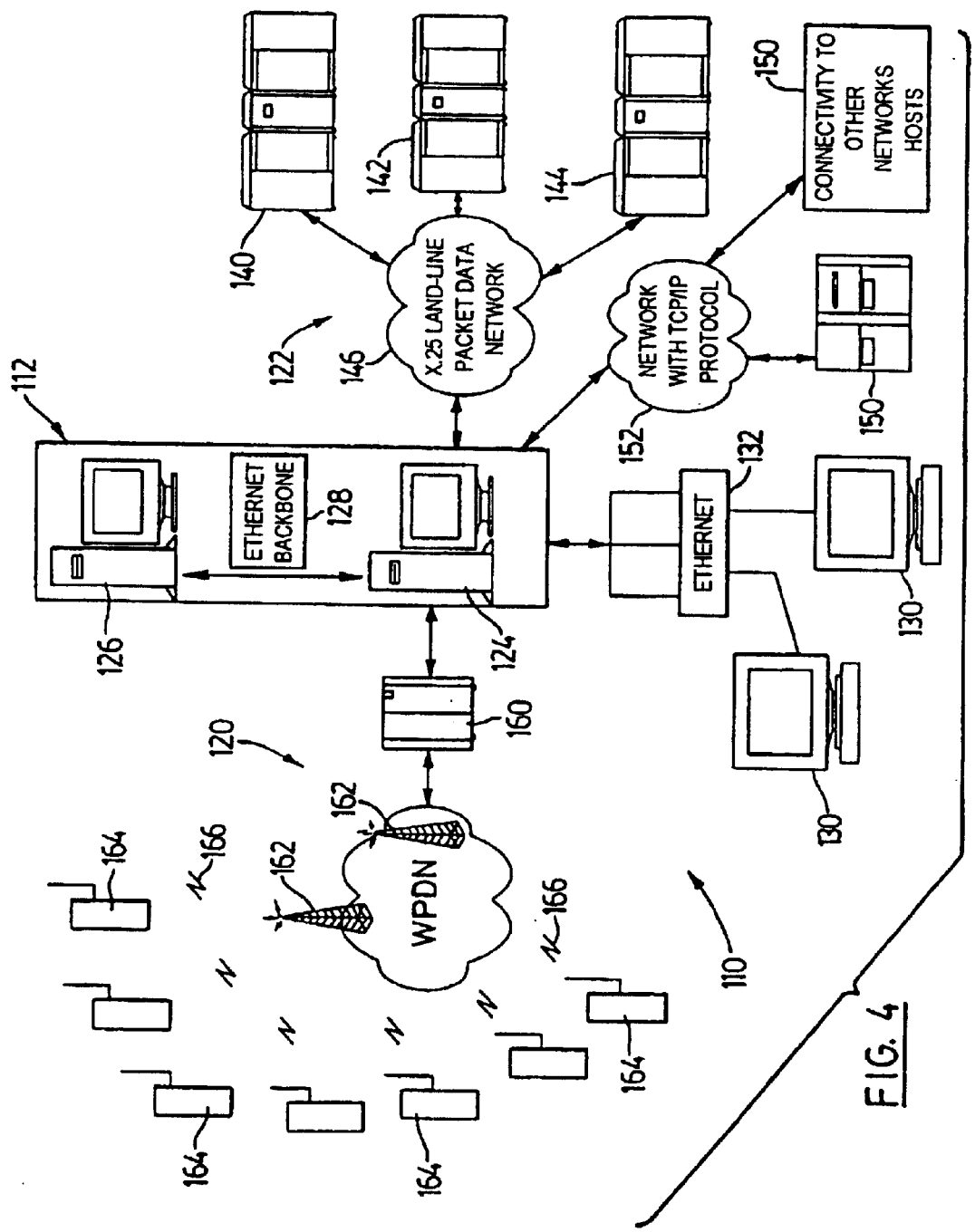
FIG. 4 illustrates a communication system including a communication server acting between wireless terminals on a wireless packet data network and host computers on land-line wired networks in accordance with the present invention.

Turning now to FIG. 4, a specific implementation of the communication system in accordance with the present invention is shown and is generally indicated to by reference numeral 110. As can be seen, the communication system 110 includes a communication server 112 incorporating a server 124 and a backup server 126 interconnected via an Ethernet backbone 128. Workstations 130 are also connected to the communication server 112 by way of an Ethernet based network 132.

The communication server 112 is connected to a land-line based wired network 122 on one side and to a wireless packet data network (WPDN) 120 including a plurality of WPDN base stations 162 on the other side. The land-line based network 122 includes a plurality of physical devices 14 such as host computers 140, 142, and 144 respectively, connected to the communication server 112 by way of an X.25 land-line packet data network 146. The land-line based network 122 also includes additional host computers 150 (only one of which is shown) connected to the communication server 112 by way of a TCP/IP protocol network 152.

The WPDN 120 includes a WPDN switch 160 acting between the communication server 112 and the WPDN base stations 162. Physical devices 14 in the form of wireless terminals 164 communicate with the WPDN base stations 162 by way of wireless RF communications links 166.

Wireless terminals 164 communicate with the host computers 140 to 144 and 150 through the communication server 112 over the WPDN 120 and land-line network 122. Likewise the host computers communicate with the wireless terminals 164 over the same communication networks. Wireless terminals 164 also communicate with other wireless terminals 164 via the communication server 112 over the WPDN 120. The host computers also communicate with each other via the communication server 112 over the land-line based network 122.

Further specifics of the communication system 110 and is operation will now be described.

Wireless Terminals

Figure 5:
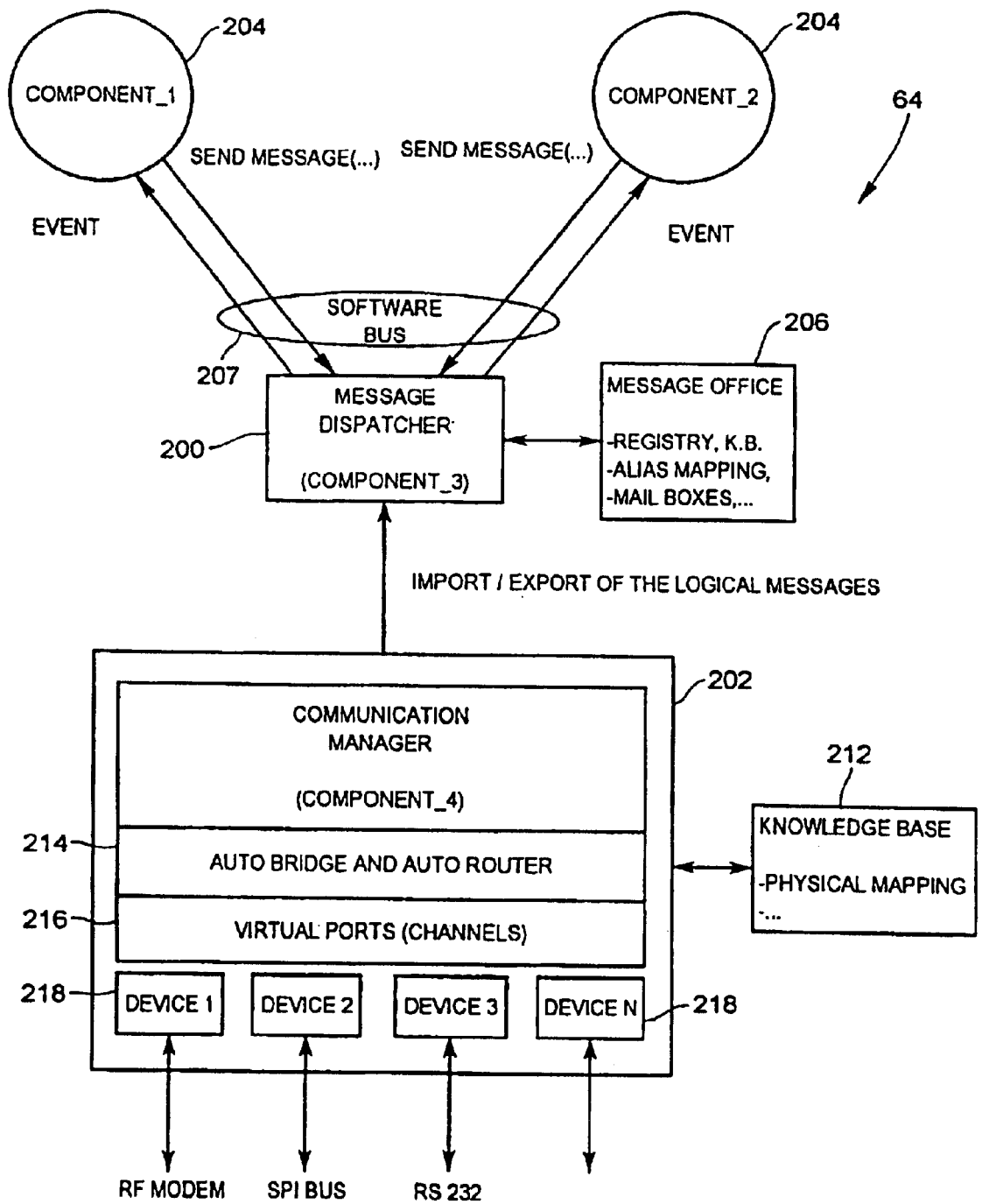
FIG. 5 is a schematic block diagram of one of the wireless terminals in the communication system of FIG. 4.
Figure 6:
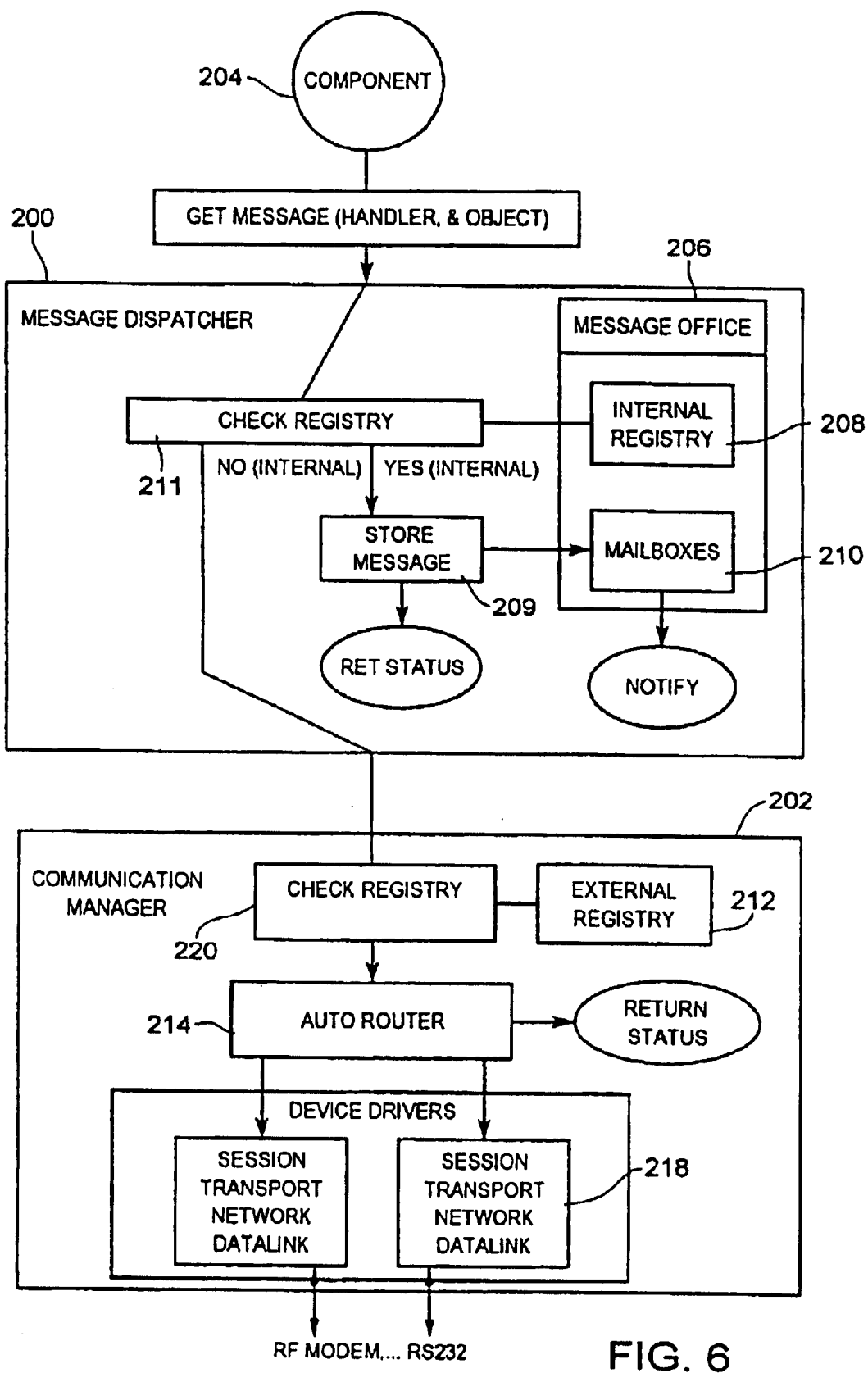
FIG. 6 shows outgoing message flow in the wireless terminal of FIG. 5.
Figure 7:
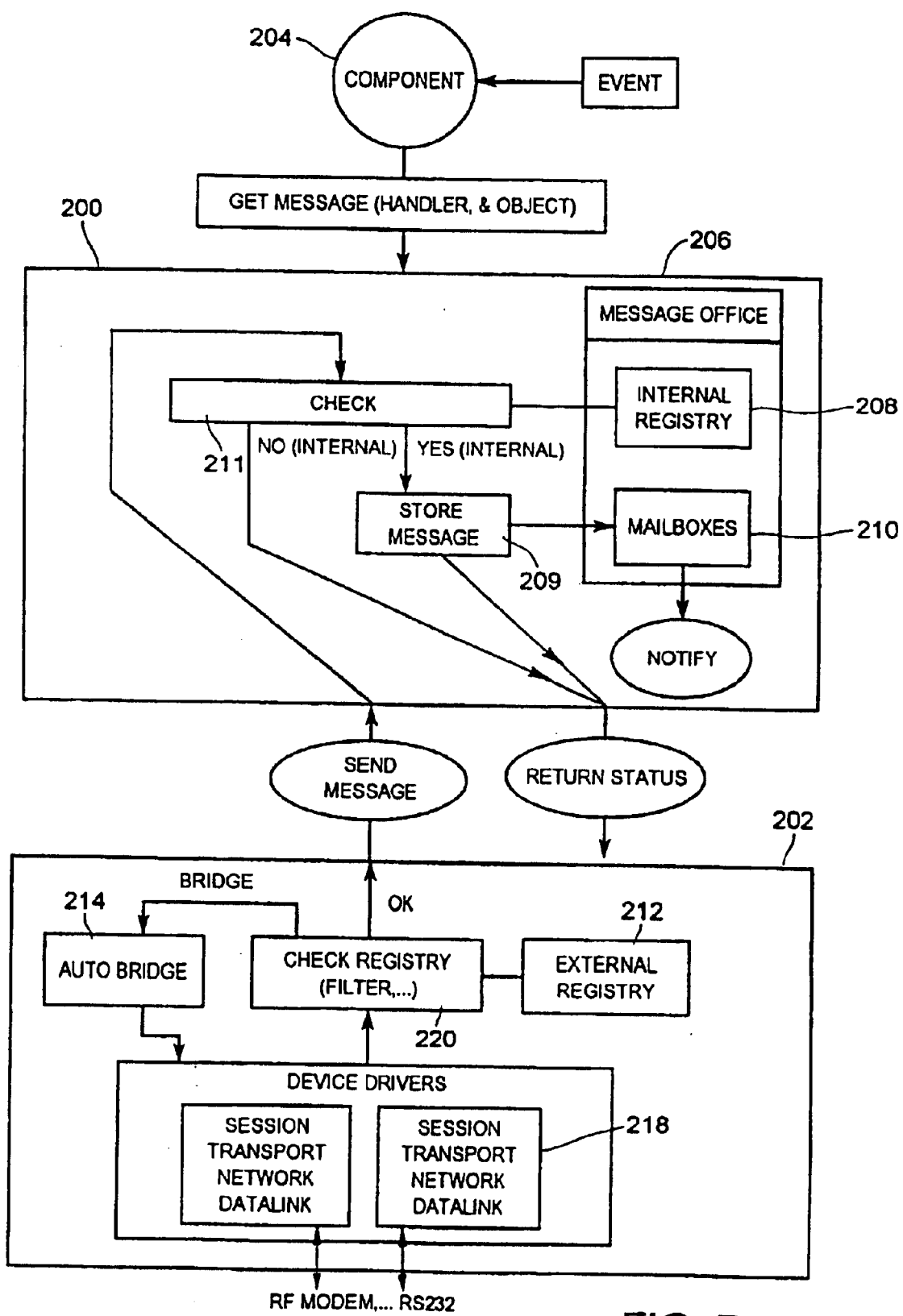
FIG. 7 shows incoming message flow in the wireless terminal of FIG. 5.

Referring now to FIGS. 5 to 7, one of the wireless terminals 164 is schematically illustrated. As can be seen, the wireless terminal 164 includes a message dispatcher 200 connected to a communication manager 202 and to the various components 204 of the wireless terminal 164 via a software bus 207. The message dispatcher 200 and communication manager 202 manage message flow in the wireless terminal 164. Specifically, the message dispatcher 200 manages the registration and unregistration of components in the wireless terminal while the communication manager 202 handles incoming and outgoing logical messages.

The message dispatcher 200 includes a check registry 211 communicating with a message office 206 including an internal registry 208 and mailboxes 210. The communication manager 202 includes a check registry 220 communicating with a knowledge base 212 providing physical mapping to message destinations. The communication manager 202 includes an autobridge and autorouter 214, virtual ports 216, input/output device drivers 218 such as an RE modem, SPI bus, RS 232, etc.

The knowledge base 212 physically maps the virtual ports 216 and device drivers 218 of the wireless terminal 164 to logical destination addresses such as the ports on the communication server 112 that communicate with the X.25 packet data network 146, TCP/IP protocol network 152, Ethernet network 132 and the WPDN 120. The knowledge base 212 requires administration and can be constructed or updated in different ways and by different sources. For example, the knowledge database 212 can be constructed or updated (i) locally by an application manager; (ii) remotely by an administrator; or (iii) on the "fly" (run-time) as a learning process.

FIGS. 4 and 5 show internal outgoing and incoming message flow within a wireless terminal 164. When a component 204 of the wireless terminal 164 requires an outgoing API message to be sent, the API of the component 204 sends a request to the message dispatcher 200. The request is in the form of a SendPostMessage call and includes the component's handler, the message destination, the type of service requested and the message envelope or object. Upon receipt of the message request, the message dispatcher 200 sends the API message to the check registry 211. The check registry 211 in turn examines the internal registry 208 of the API message office 106 to determine if a destination mailbox 210 for the API message exists. If a destination mailbox 210 for the API message is found by the check registry 211, the API message is internal. At this stage, a store service 209 stores the message in the destination mailbox 210. The destination mailbox 210 in turn generates an event, which notifies the destination component of the wireless terminal 164 that a new API message is waiting. The message dispatcher 200 then sends a status return to the message sending component 204. When the destination component receives the event, the API of that component retrieves the event via a GetMessage call and processes the API message.

If a destination mailbox 210 does not exist, the API message is external. At this point, the message dispatcher 200 conveys the API message to the communication manager 202. Upon receiving the API message, the check registry 220 within the communication manager 202 checks the external registry 212 to get connectivity information for the API message based on the message destination. If no entry is found in the external registry 220 for the API message, the API message is discarded and an error message is returned to the message dispatcher 200 which in turn notifies the message sending component 204.

If connectivity information for the API message exists in the external registry 212, the API message and its connectivity information are passed to the autorouter 214 for processing. In response, the autorouter 214 returns a status message to the message sending component 204 via the message dispatcher 200 and creates a logical message LMSG, which is passed to the appropriate device driver 218 based on the connectivity information via a virtual port 216. The device driver 218 sends the logical message LMSG to the physical output port allowing the logical message to be sent over the WPDN 120.

When an incoming logical message is received on an output port of the wireless terminal 164, the associated device driver 218 passes the incoming logical message LMSG to the check registry 220. The check registry 220 performs filtering and checking of the logical message based on information in the external registry 212 associated with the message sending party. If the logical message is not recognized, it is discarded by the check registry 220. During the checking and filtering of a recognized logical message LMSG, the check registry determines whether the logical message is to be processed by the autobridge 214 or conveyed as an API message to the message dispatcher 200. If the logical message is to be processed by the autobridge 214, the check registry 220 conveys the logical message to the autobridge, which in turn routes the logical message to the proper device driver 218. Otherwise, the check registry 220 passes the API message to the message dispatcher 200.

When the message dispatcher 200 receives the API message from the communication manager 202, the check registry 211 checks the internal registry 208 to find the correct mailbox 210 for the received API message. When the mailbox is found, the API message is passed to the store service 209, which stores the API message in the mailbox 210. The mailbox 210 in turn generates an event to notify the component 204 associated with the mailbox that a new API message has arrived. When the component 204 receives the event from the mailbox 210, the API of the component 204 retrieves the API message via a GetMessage call. The API message is then processed by the API.

Communication Server

Figure 8:
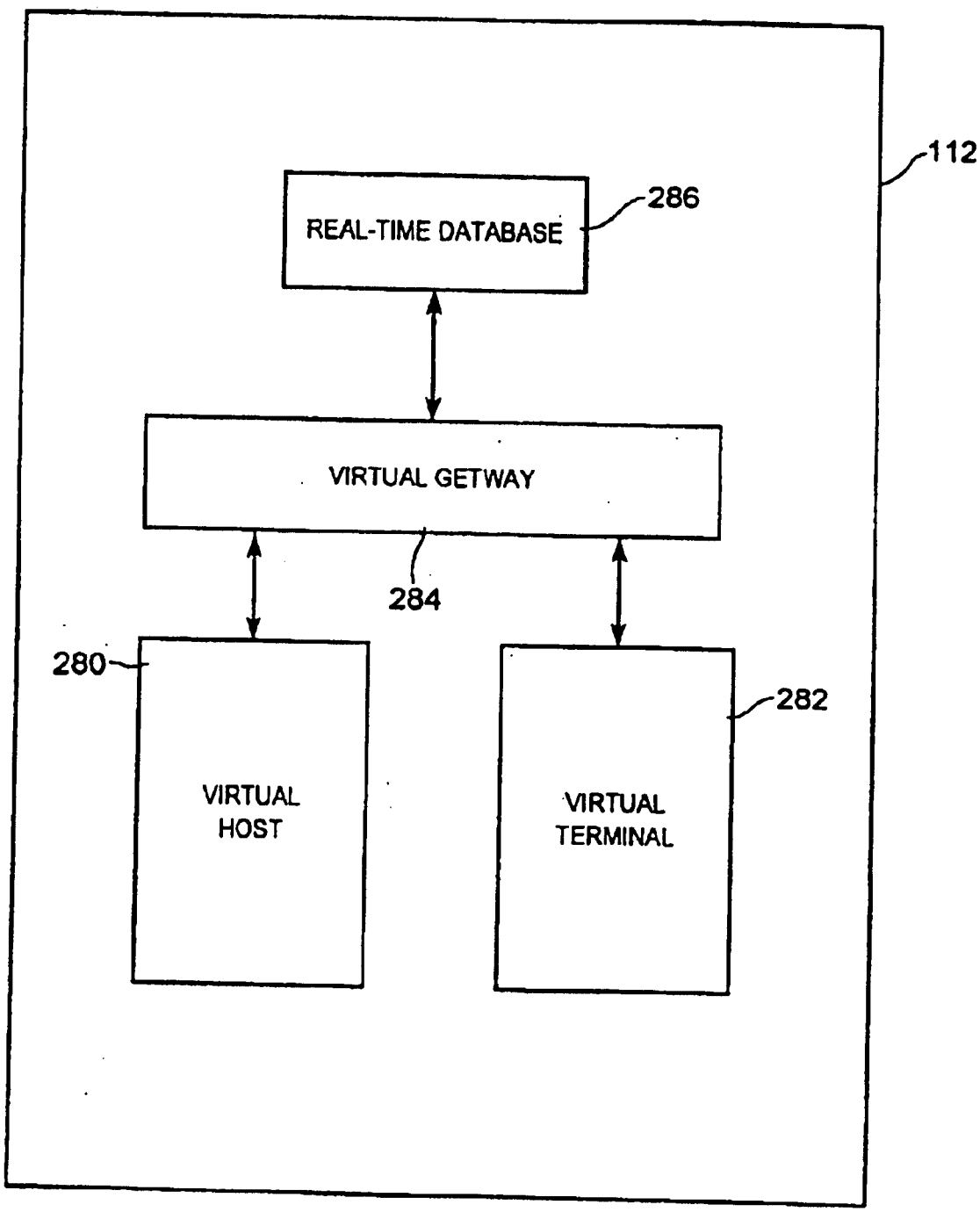
FIG. 8 is a schematic block diagram of the communication server in the communication system of FIG. 4.
Figure 9:
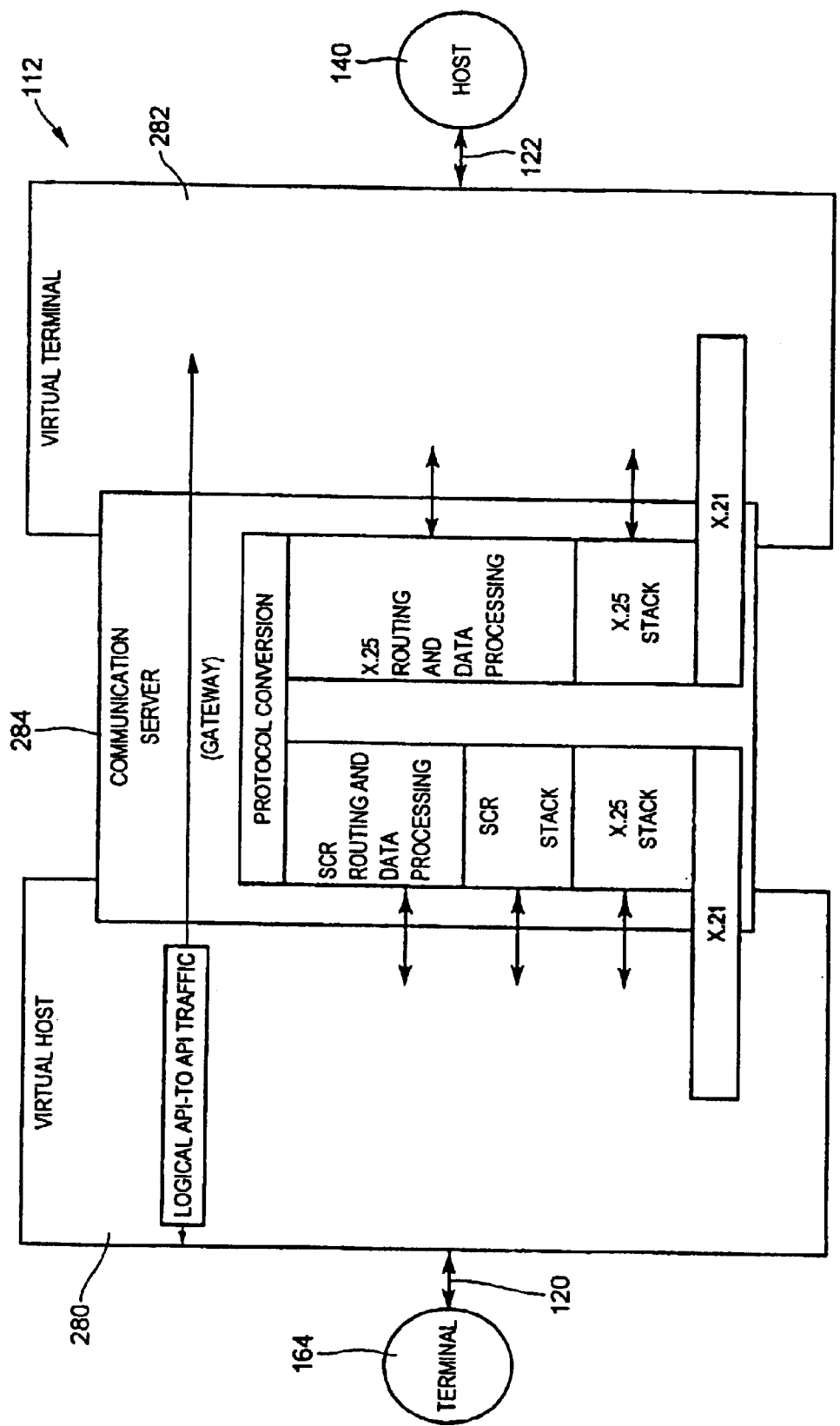
FIG. 9 is another schematic block diagram of the communication server in the communication system of FIG. 4.

Referring now to FIGS. 8 and 9, the communication server 112 is better illustrated. As can be seen, the communication server 112 includes a front end in the form of a virtual host 280 communicating with the WPDN 120 and a back end in the form of a virtual terminal 282 communicating with the land-line based network 122. A virtual gateway 284 acts between the virtual terminal 282 and the virtual host 280. The virtual gateway 284 accesses a knowledge base 286 including a real time database. Rather than using hard-coding translation in the virtual gateway 284 to deal with different protocols used by the WPDN 120 and the land-line networks 122, the information required to translate protocols is recorded in the real time database of the knowledge base 286.

Figure 10:
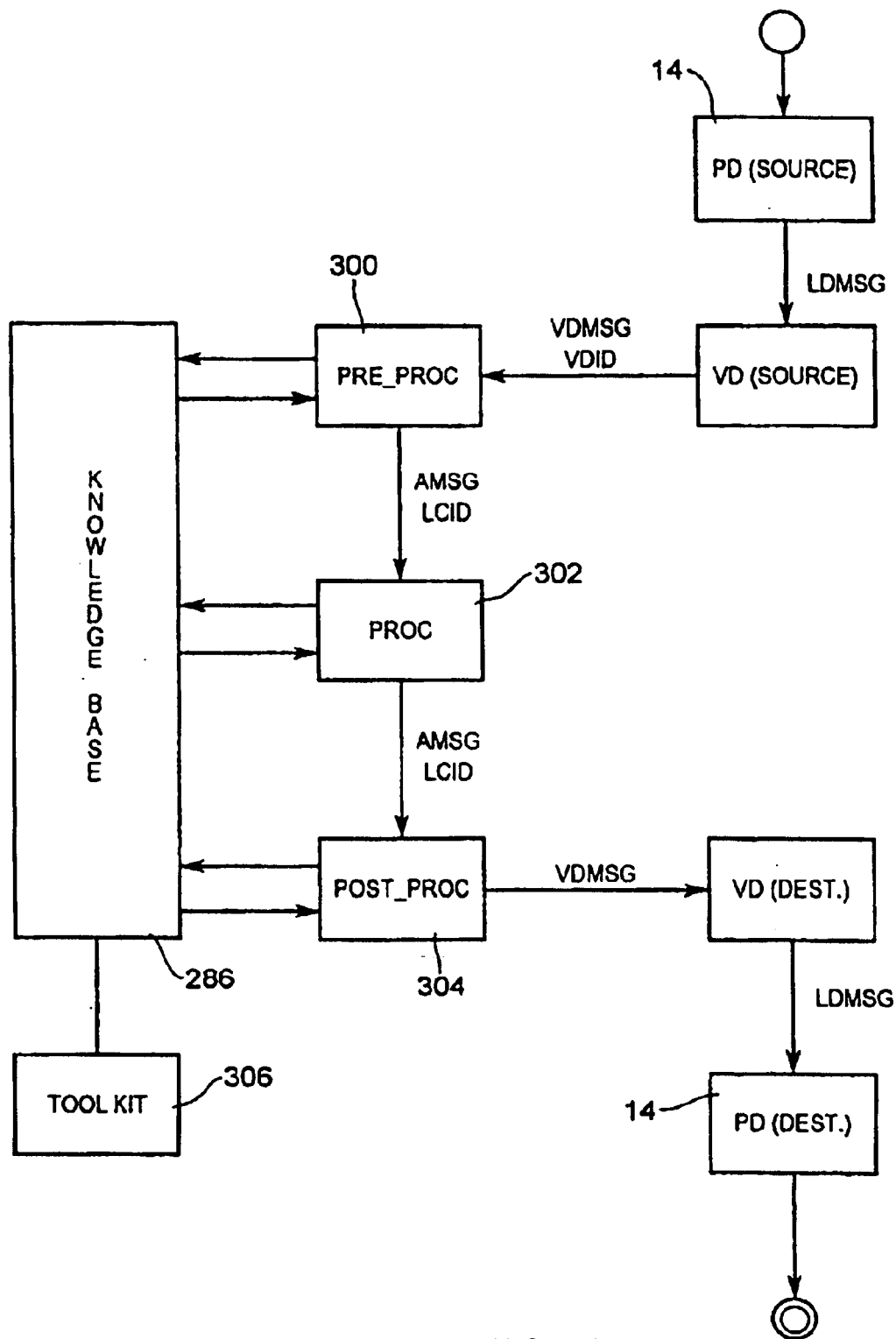
FIG. 10 is a schematic block diagram of a virtual gateway forming part of the communication server of FIGS. 8 and 9.

Turning now to FIG. 10, the virtual gateway 284 is better illustrated. Virtual gateway 284 includes a preprocessor 300 receiving input from a virtual device VD (either the virtual host 280 or the virtual terminal 282) that receives logical messages from a sending physical device 14. The preprocessor 300 communicates with the knowledge base 286 and with a processor 302. Processor 302 also communicates with the knowledge base 286 as well as with a postprocessor 304. The postprocessor 304 communicates with the knowledge base 286 and provides output to a virtual device VD (either the virtual host 280 or the virtual terminal 282). The virtual device VD in turn sends a logical message to a receiving physical device 14. An expert system tool kit 306 allows the knowledge base 286 to grow to meet the needs of the communication system 110.

The knowledge base 286, excluding the real time database, is divided into three parts, namely a registry, a static logical table and a dynamic database. The registry records basic information for each registered physical device 14 in the communication system 110. Each record in the registry includes a physical device ID, an application ID, a virtual device ID and a device properties ID. This information is entered into the knowledge base when the physical devices are registered The registry also contains mappings from physical IDs to logical IDs. Each mapping represents one application of the registered physical device. Therefore, if the physical device uses two applications through the virtual gateway 284, two mappings associated with the physical device exist in the registry.

The static logic table stores logical information with respect to registered connections including logical connection IDs, logical device IDs, virtual device IDs, API IDs, logical message wrapping information, logical message unwrapping information, virtual device message wrapping information, virtual device message unwrapping information, knowledge base IDs, virtual processor IDs and processor property IDs.

The dynamic database contains dynamic information. It is a real time database that updates the current status of each connection between physical devices in the communication system 112. Entries in the dynamic database include knowledge base IDs, logical connection IDs, connection status and current state.

The preprocessor 300 receives virtual device messages VDMSGs from either the virtual terminal 282 or virtual host 280 in response to logical messages LMSGs received by a virtual device VD from a physical device 14 such as a wireless terminal or a host computer. Messages received by the preprocessor 300 are conveyed to the processor 302. Following processing at the processor 302, the processed messages are conveyed to the postprocessor 304 which in turn passes the processed messages to either the virtual host 280 or virtual terminal 282. The virtual host 280 or virtual terminal 282 in turn passes the processed messages to the appropriate physical device 14.

Figure 11:
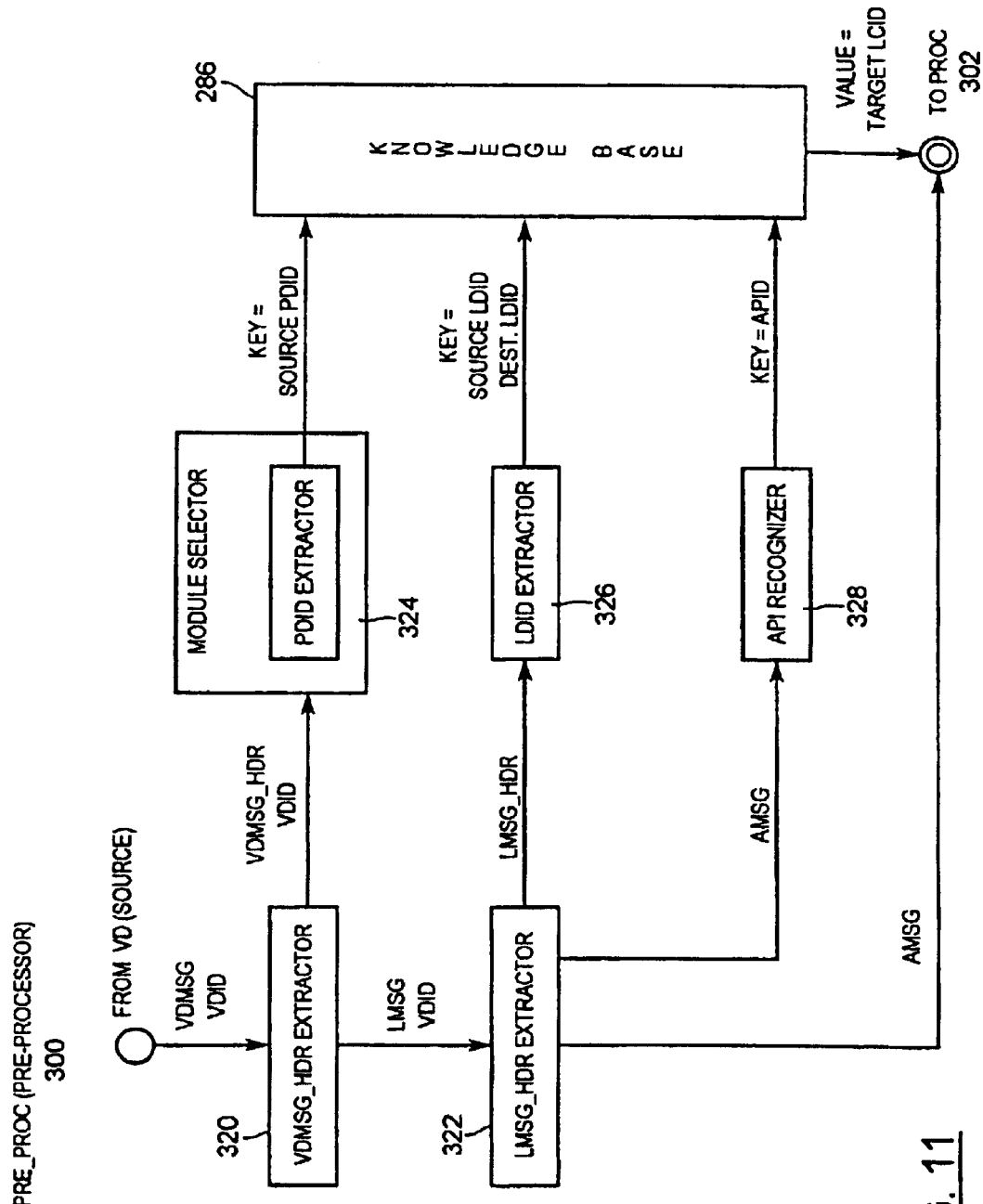
FIGS. 11 to 13 are block diagrams showing message processing in the virtual gateway of FIG. 10.

The preprocessor 300 is designed to unwrap incoming messages and determine target logical connections for the incoming messages using a number of service processors as shown in FIG. 11. When the preprocessor 300 receives a message from a virtual device VD together with its virtual device ID, the preprocessor 300 separates the incoming virtual device message VDMSG into a virtual device message header VDMSG_HDR and a logical message LDMSG (block 320). The logical message LDMSG is then further separated into a logical message header LDMSG_HDR and an API message AMSG (block 322). After the incoming message has been unwrapped, the preprocessor 300 determines the target logical connection ID for the API message. Specifically, the preprocessor 300 first attempts to retrieve the target logical connection ID from the knowledge base 286 using the virtual device message header VDMSG_HDR as a key (block 324). If the virtual device message header is absent or if retrieval of the target logical connection ID from the knowledge base 286 is not successful, then the preprocessor 300 attempts to retrieve the target logical connection ID from the knowledge base 286 using the logical message header LMSG_HDR as a key (block 326). If the logical message header is absent or if retrieval of the target logical connection ID from the knowledge base 286 is not successful, the preprocessor 300 uses the API message AMSG as a key to search the knowledge base 286 for the target logical connection ID (block 328). Once the target logical connection ID is located, it is passed to the processor 302 with the API message.

Figure 12:
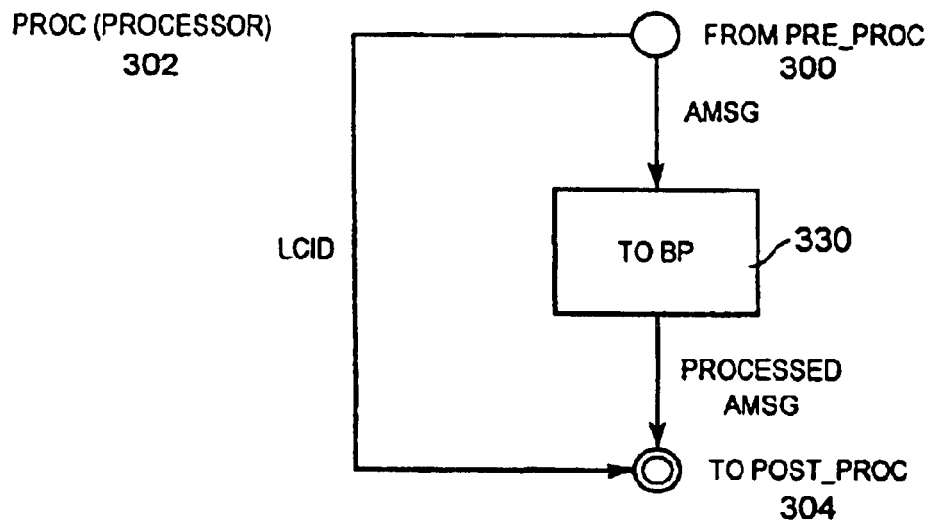

When the processor 302 receives the API message and the target logical connection ID from the preprocessor 300, the processor 302 processes the API message. During processing, one of the business processors accesses appropriate protocol translation information in the knowledge base 286 based on the target logical connection ID. Once translation information is accessed, another business processor handles the protocol translation using the accessed information (see block 330 in FIG. 12). This of course makes gateway connections between the communicating virtual devices VD through the virtual gateway 284 more efficient and flexible since any changes in protocols can be reflected by updating the knowledge base 286. Also, by keeping translation information for various protocols in the knowledge base 286, the virtual gateway 284 can be used to connect virtually any communicating physical devices. After processing, the processed API message is passed to the postprocessor 304 together with the target logical connection ID.

Figure 13:
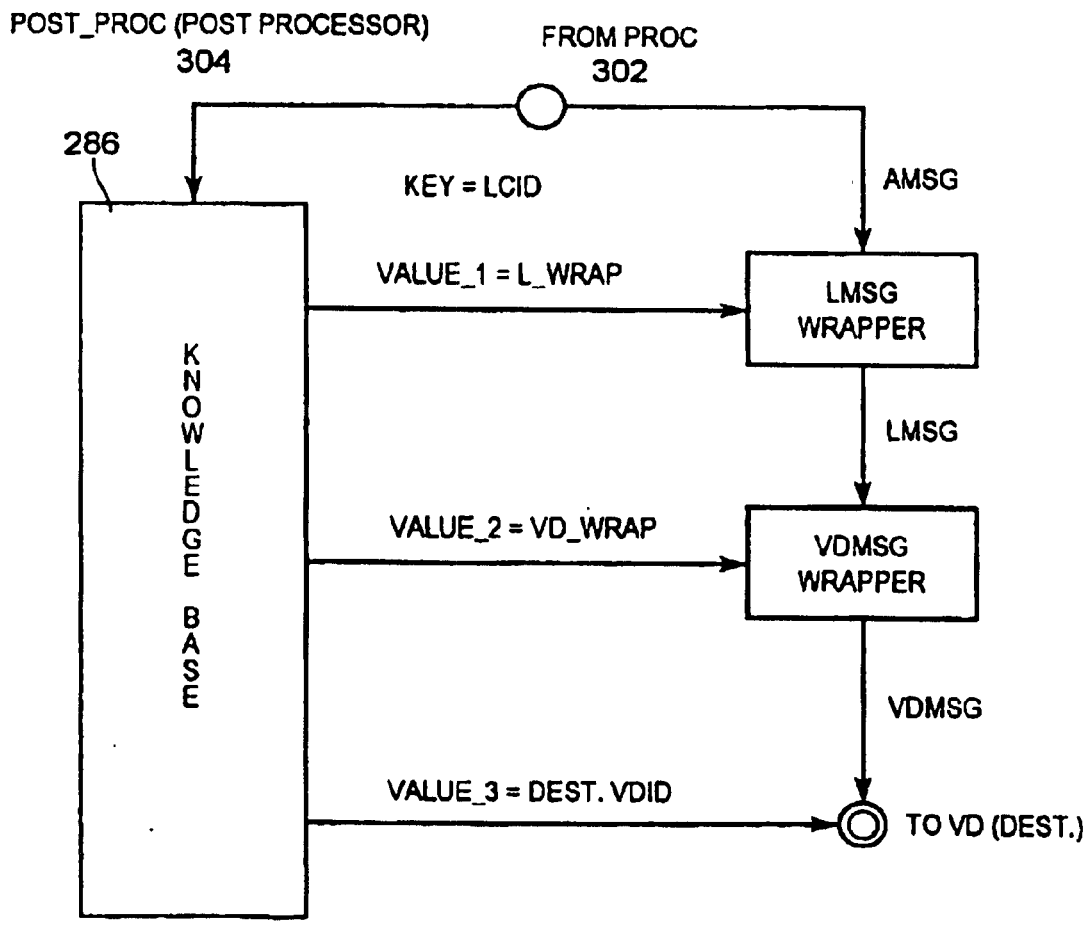

When the postprocessor 304 receives the processed API message and the target logical connection ID from the processor 302, the postprocessor 304 retrieves logic message wrapping and virtual device wrapping from the knowledge base 286 based on the target logical connection ID and wraps the processed API message accordingly (see blocks 332 and 334 in FIG. 13) thereby to form a virtual device message VDMSG. The destination virtual device is also retrieved from the knowledge base 286 using the target logical connection ID as a key and the virtual device message VDMSG is conveyed to the appropriate destination virtual device.

Since the wireless terminals 164 in this embodiment follow the same logical model as the communications server 112 and since logical messages transmitted by the wireless terminals include the target logical connection ID, logical messages LMSGs received by the communication server 112 from wireless terminals can be processed easily and routed to the proper destination.

API messages destined for wireless terminals that come from "unknown" sources such as host computers, which do not include a logical message header LMSG_HDR, must be built into logical messages by the communication server 112. The business processors in the processor 302 use fuzzy logic and artificial intelligence to access the appropriate protocol information and build the logical messages. The tool kit 306 is used to initially build the knowledge base 286 so that it includes the basic API requirements of the host computers. As communications traffic passes through the communication server 112, the communication server 112 updates the knowledge base 286.

One special case that arises in communications between host computers and the communication server 112, is protocols with "zero messages". Protocols of this nature do not include API data. This of course prevents logical messages from being built. This is dealt with by the communication server 112 using the knowledge base 286.

As will be appreciated, since the knowledge base 286 stores connectivity information for the registered physical devices as well as protocol translation information and since logical messages transmitted by the wireless terminals 164 provide destination information, the communication server 112 is able to ensure communications connectivity between all physical devices in the communication system 112 regardless of network platforms.

In the present embodiment, the wireless network 120 is described as a DataTAC WPDN. DataTAC wireless packet switching data networks require 56 to 64 kbps backbone communication pipe per physical connection with SCR (standard context routing) over X.25, through PVCs (permanent virtual circuits) or SVCs (switched virtual circuits). The communication server 112 provides full connectivity to host computers via this communication path. Full connectivity is especially important in the case where the wireless terminals 164 transmit financial transaction data where ETE POS (end to end point of sale) protocol is a must. Unlike the communication server 112, DataTAC engine servers do not provide ETE connectivity.

The communication server 112 also supports other wireless networks such as for example Mobitex, CDPD, GSM or PCS. Mobitex wireless packet switching data networks are very similar to DataTAC WPDNs and therefore, the communication server 112 bridges the connectivity gap between this wireless network and land-line networks. CDPD wireless packet data networks are the most demanding in terms of throughput and speed. These networks are entirely based on the TCP/IP protocols. GSM/PCS networks are circuit switched wireless cellular networks where again end to end (ETE) connectivity is an issue.

Connectivity

In addition to logical addressing, data exchange between a physical device 14 and the communication server 112 is another important part of the logical message. Data can be exchanged in two manners, namely asynchronously or synchronously. The logical message LMSG indicates which communication manner is supported and embeds this information into its header as a Type and Tag.

Asynchronous data exchange is datagram oriented. During asynchronous data exchange, a request datagram is sent to the communication server 112 by the physical device. The communication server 112 responds to this request by returning a respond datagram. Recognition of the "Request-Respond" handshake in the logical message is done in the Tag field and is referred to as the handshake ID. The handshake ID is a unique ID and is returned by the communication server 112. The handshake ID value is within the range of 1 to 65535.

Synchronous data exchange is session oriented. During synchronous data exchange, a request message (it can be as the first message of the conversation) to open a "conversation" session is sent to the communication server 112 by the physical device. The communication server 112 creates a session and its session ID is returned. During the conversation time via this session, both the physical device and the communication server 112 keep the same session ID until either the physical device decides to close the conversation or there is a communications problem at the communication server 112. The session ID value is within the range of 1 to 32767 (2 bytes), where value 1 is a request to open a session and a negative value is a request to close a session. The value 0 is an invalid session ID.

The format of the logical message LMSG is as follows:

| SID | Type | Tag | Src | Dst | API Message Body |
| --- | --- | --- | --- | --- | --- |

SID represents a signature ID, that is calculated (CRC) from its header context. The field is used to recognize third party messages. The remaining fields support logical connectivity and the API data exchange mechanism.

Type is a message type indicator to recognize a data exchange mechanism. It reflects the manner between which two API components will cooperate.

Tag represents additional run-time information regarding to the type of the logical message. This tag ID is a unique conversation number between the two API components.

The datagram communication mechanism is as follows:

Tag ID=0, means invalid session ID; and

Tag ID=1<Handshake ID<65535.

The session (message) communication mechanism is as follows:

Tag ID=0, means invalid session ID;

Tag ID=1, means request to open session, or the first message;

Tag ID=1, <Session ID<32767 means a valid session; and
Tag ID=−32767<Session ID<−1, request to close a session, or the last message.

Src. is a logical address of the source and Dst. is a logical address of the destination.

The format of the API message AMSG is as follows:

| EXT | D/M | Duplicate | Reserve | Reserve | b2 | b1 | b0 |
|-----|-----|-----------|---------|---------|----|----|----|

Ext is an extension bit to allow insertion of another header,

D/M is the datagrarn or message;

Duplicate is a logical message duplicate; and b2, b1 and b0 are bits describing data exchange.

Figures 1, 14:
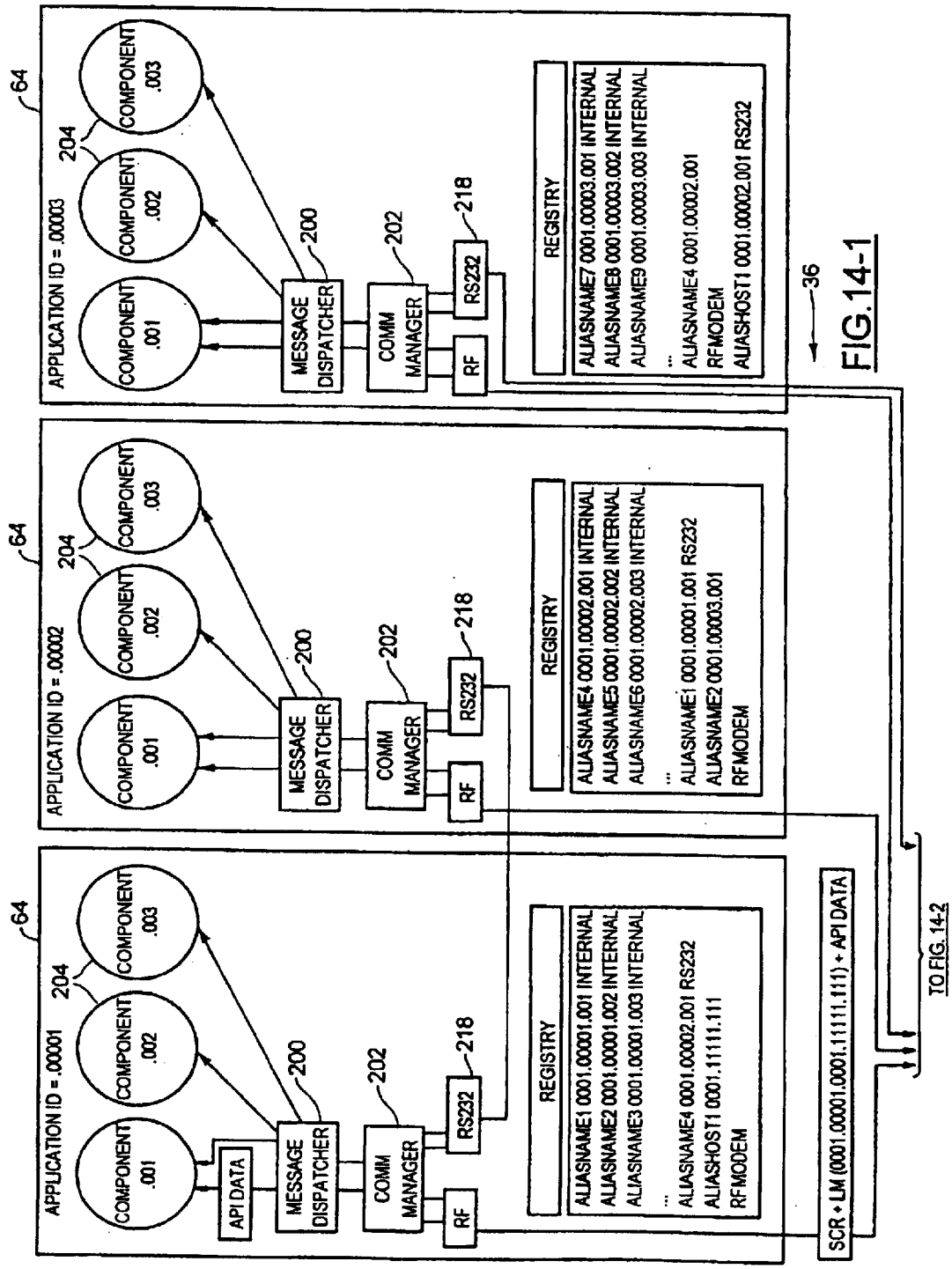
FIG. 14 shows communications connectivity between wireless terminals and host computers in the communication system of FIG. 4.
Figures 2, 14:
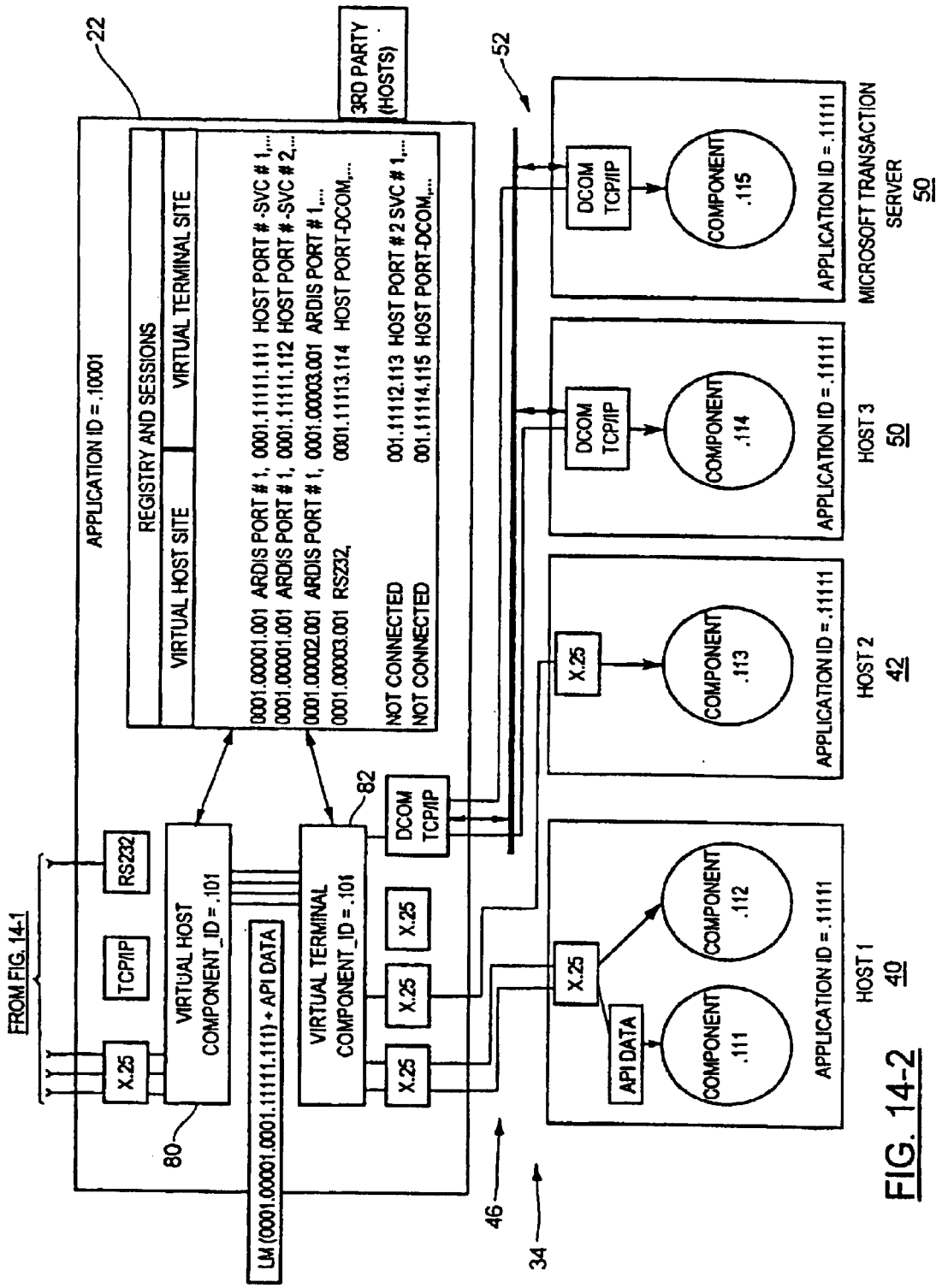
Figure 15:
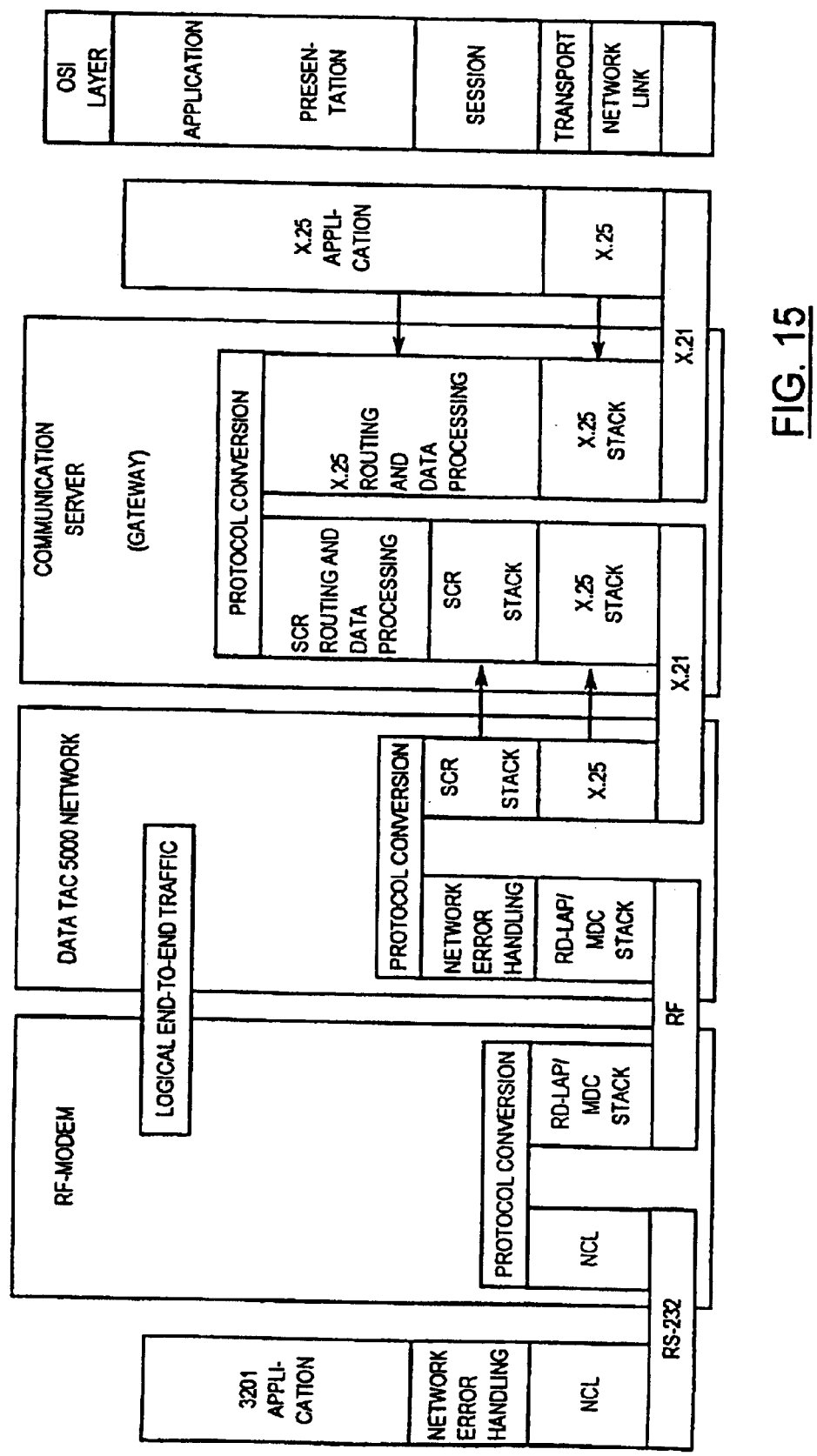
FIG. 15 shows an OSI model protocol stack and its conversions in a communications path across the communication system of FIG. 4.

FIGS. 14 and 15 show communications connectivity between wireless terminals and host computers in the communication system 110 including the OSI model protocol stack and its conversions across the communications path.

Many wireless networks provide for "fleet connectivity" (one to many). Fleet connectivity cares only about the destination. This is a synchronous protocol. Between the communication server 112 and the WPDN switch 160, messages are routed via SVC's (switchable virtual circuits) located in the so called SVC SINK. SVC concept comes from the packet data networks (like X.25). The communication server 112 and the host computers communicate synchronously via dedicated SVCs. That means that a limited number of SVCs have to handle many wireless terminals. This traffic is handled by the communication server 112.

Communication server 112 enables three types of connectivity through the SVCs and enhances communication throughput, namely device connections, sessions connections and asynchronous datagram messaging. Asynchronous datagram messaging follows the dynamics of the traffic and accommodates any increase in the traffic. A limited number of SVCs provide throughput for a much larger number of wireless terminals. Device connection is permanent-static (terminal corresponds to the specific SVC). Session locks communication SINK only temporarily.

End-TO-End Communications

For a host computer to host computer connection through the communication server 112, the source host computer transmits an API message to the communication server 112 without any wrapping. After the API message passes through the virtual terminal 282, the API message as well as the virtual device ID of the virtual terminal 282 is sent to the preprocessor 300. As mentioned previously, the preprocessor attempts to extract the virtual device message header VDMSG_HDR and the logic message header LMSG_HDR from the API message. In this case, the preprocessor 300 recognizes that the API message does not include a virtual message header or a logical message header. The preprocessor 300 in turn analyzes the API message and interacts with the knowledge base 286 to determine the-target logical connection ID for the API message. After the target logical connection ID is located, it is sent with the API message to the processor 302. The processor 302 passes the API message to the business processors therein, which in turn process the message to ensure the API message protocol is compatible with that used by the destination host computer. The processed API message is then passed to the postprocessor 304 with the target logical connection ID. The postprocessor uses the target logical connection ID as a key to search the knowledge base 286 for wrapping information.

In this case, since the destination is a host computer, no wrapping is required. The postprocessor 304 in turn uses the target logical connection ID to find the destination virtual device, in this case the virtual terminal 282, and passes the API message to it. The virtual terminal 282 in turn passes the API message to the destination host computer over the land-line network 122.

If a wireless terminal 164 has established a connection with a host computer, logical messages generated by the wireless terminal are sent to a network provider that connects to the communication server 112 to the WPDN 36. Logical messages transmitted by the wireless terminal 164 to the host computer include a virtual device message header VDMSG_HDR. The logical message LMSG includes a logical message header LMSG_HDR and the API message. The messages received by the virtual host 280 from the wireless terminal 164 are passed to the preprocessor 300. The preprocessor 300 extracts both the virtual device message header VDMSG_HDR and the logical message header LMSG_HDR from the API message. The preprocessor 300 then analyzes the virtual device message header for the source physical device ID. It then uses the physical device ID as a key to search the knowledge base 286 for the registered target logical connection ID. If there is more than one target logical connection ID in the knowledge base 286 registered with the physical device ID, then the preprocessor 300 analyzes the logic message header LMSG_HDR to determine the source and destination logical IDs. This information is then used to search the knowledge base 286 to determine the target logical connection ID. After the target logical connection ID is located, the target logical connection ID is sent to the processor 302 together with the API message. The business processors in the processor in turn process the API message as described previously. The processed API message is then passed to the postprocessor 304 together with the target logical connection ID. The postprocessor 304 uses the target logical connection ID as a key to search the knowledge base 286 for wrapping information. In this case, since the destination is a host computer, no wrapping is required. The postprocessor 304 in turn uses the logical connection ID to find the target virtual device, in this case the virtual terminal 282, and passes the message to it. The virtual terminal 282 in turn passes the API message to the destination host computer over the land-line network 122.

If a wireless terminal 164 is communicating with another wireless terminal, messages are sent from the source wireless terminal through the WPDN 120 to the communication server 112. Since a wireless terminal is transmitting messages, the virtual host 280 receives virtual device messages which include a virtual device message header and a logical message. The logical message includes a logical message header and the API message. The message is processed in the manner described above by the preprocessor 300 and the processor 302. However, when the postprocessor 304 receives the target logical connection ID and the processed API message, it uses the target logical connection ID as a key to search the knowledge base 286 for wrapping information. In this case, since the destination is a wireless terminal, both logical message and virtual device message wrapping are required. The postprocessor 304 in turn receives the wrapping information from the knowledge base and wraps the API message in the appropriate manner before passing the wrapped message to the virtual host 280 for transmission over the WPDN 120 to the destination wireless terminal.

Those of skill in the art will appreciate that the present invention provides advantages in that communications connectivity between physical devices is maintained even though the networks to which the physical devices are connected implement different API protocols.

Although a preferred embodiment of the present invention has been described, those of skill in the art will appreciate that variations and modifications may be made without departing from the spirit and scope thereof as defined by the appended claims.

What is claimed is:

1. A communication system comprising:
    at least two communication networks over which communications between physical devices connected to said communication networks are to be carried, said communication networks implementing different protocols for messaging; and
    a communication server acting between said communication networks and through which messages transmitted between said communication networks pass, said communication server comprising a knowledge base storing information identifying each physical device registered in said communication system, information identifying registered connections available in said communication system including protocol conversion information for each registered connection where necessary and information identifying the status of each actual connection between physical devices in said communication system, said communication server accessing said knowledge base upon receipt of a message and searching said knowledge base for appropriate protocol conversion information, wherein during said searching said communication server initially uses a header of said message as a key to searching said knowledge base for said protocol conversion information and if said search fails, said communication server uses a body of said message as said key to search said knowledge base for said protocol conversion information, said communication server converting the protocol of the received message to a protocol compatible with the communication network to which said message is being sent using the determined protocol conversion information.

2. A communication system as defined in claim 1 wherein said communication server includes virtual devices communicating with said communication networks and a virtual gateway bridging said virtual devices, said virtual gateway accessing said knowledge base and converting protocols of said messages.

3. A communication system as defined in claim 2 wherein said virtual gateway includes a preprocessor, a processor and a postprocessor, said preprocessor examining each incoming received message to locate target logical connection information determining the target destination for said incoming message, said target logical connection information being used as said key, said processor converting the protocol of each incoming message, where appropriate, based on the results of said search using said target logical connection information, said postprocessor wrapping each message received from said processor with headers, where appropriate.

4. A communication system as defined in claim 3 wherein one of said communication networks is a wireless network and wherein one of said communication networks is a wired land-line network.

5. A communication system as defined in claim 4 wherein messages transmitted over said wireless network, include API message bodies to be processed by destination physical devices and logical message headers including target logical connection information specifying the destinations for said API message bodies, said logical message headers wrapping said API message bodies.

6. A communication system as defined in claim 5 wherein said preprocessor strips the logical message header from said API message body upon receipt of a message from said wireless network and uses the target logical connection information in said logical message header as said key to search said knowledge base for said protocol conversion information.

7. A communication system as defined in claim 6 wherein said preprocessor analyzes the API message body upon receipt of a message received from said wireless network for said target logical connection information if said target logical connection information cannot be determined from said logical message header and uses the target logical connection information in said API message body as said key to search said knowledge base for said protocol conversion information.

8. A communication system as defined in claim 7 wherein messages transmitted over said land-line network include API message bodies without headers, said preprocessor analyzing the API message body upon receipt of a message received from said land-line network for said target logical connection information and using the target logical connection information in said API message body as said key to search said knowledge base for said protocol conversion information.

9. A communication system as defined in claim 4 wherein messages transmitted over said land-line network include API message bodies without headers, said preprocessor analyzing the API message body upon receipt of a message received from said land-line network for said target logical connection information and using the target logical connection information in said API message body as said key to search said knowledge base for said protocol conversion information.

10. A communication system as defined in claim 1 wherein physical device identifications are stored in a registry of said knowledge base, wherein registered connection identifications and related protocol conversion information are stored in a logical table of said knowledge base and wherein actual connection status information is stored in a dynamic updatable database of said knowledge base.

11. A communication system as defined in claim 10 wherein said registry stores a record for each registered physical device, said record comprising a physical device ID, an application ID, a virtual device ID and a physical ID to logical ID mapping.

12. A communication system as defined in claim 11 wherein each registered connection identification includes logical connection IDs, logical device IDs, virtual device IDs, and logical message and virtual device massage wrapping and unwrapping information.

13. A communication server acting as a gateway for the transmission of messages between two virtual devices communicating with networks implementing different protocols, said communication server comprising:
    a knowledge base storing information identifying each physical device registered in said communication system, information identifying registered connections available in said communication system including protocol conversion information for each registered connection where necessary to convert messages of one protocol to a different protocol and information identifying the status of each actual connection between physical devices in said communication system; and a virtual gateway accessing said protocol conversion information upon receipt of a message to be transmitted between said virtual devices and converting the protocol of said message to a protocol compatible with the network to which said message is being sent, said communication server accessing said knowledge base upon receipt of a message and initially searching said knowledge base for appropriate protocol conversion information using a header of said message as a key to locating said protocol conversion information in said knowledge base, said communication server using a body of said message as said key if said initial search fails or if said message does not include a header.

14. A communication server as defined in claim 13 wherein said virtual gateway includes a preprocessor, a processor and a postprocessor, said preprocessor examining each incoming received message to locate target logical connection information determining the target destination for said incoming message, said target logical connection information being used as said key, said processor converting the protocol of each incoming message, where appropriate, based on the results of said search using said target logical connection information, said postprocessor wrapping each message received from said processor with headers, where appropriate.

15. A communication server as defined in claims 14 further including a tool kit to setup said knowledge base with said protocol conversion information.

16. A communication server as defined in claim 15 wherein said virtual gateway updates said protocol conversion information based on message traffic therethrough.

17. A communication server as defined in claim 14 wherein said messages include API message bodies and logical message headers, said API message bodies and logical message headers including target logical connection information specifying the destinations for said messages.

18. A communication server as defined in claim 17 wherein said preprocessor strips the logical message header from said API message body upon receipt of a message and uses the target logical connection information in the logical message header as said key to search said knowledge base for said protocol conversion information.

19. A communication server as defined in claim 18 wherein said preprocessor analyzes the API message body for the target logical connection information if the target logical connection information cannot be determined from the logical message header or if said search fails and uses the target logical connection information in the API message body as said key.

20. A communication server as defined in claim 13 wherein physical device identifications are stored in a registry of said knowledge base, wherein registered connection identifications and related protocol conversion information are stored in a logical table of said knowledge base and wherein actual connection status information is stored in a dynamic updatable database of said knowledge base.

21. A communication server as defined in claim 20 wherein said registry stores a record for each registered physical device, said record comprising a physical device ID, an application ID, a virtual device ID and a physical ID to logical ID mapping.

22. A communication server as defined in claim 21 wherein each registered connection identification includes logical connection IDs, logical device IDs, virtual device IDs, and logical message and virtual device massage wrapping and unwrapping information.

23. A communication server acting as a gateway for the transmission of messages between two virtual devices communicating with networks implementing different protocols, said communication server comprising:
a knowledge base comprising a registry identifying each physical device registered to deliver messages for transmission between said virtual devices and through said gateway, a logical table identifying each registered connection available between physical devices and protocol conversion information required for each registered connection to convert messages of one protocol to a different protocol and a dynamic database identifying the current status of each actual connection between physical devices; and
a virtual gateway accessing said knowledge base for protocol conversion information upon receipt of a message to be transmitted between said virtual devices and converting the protocol of said message to a protocol compatible with the network to which said message is being sent wherein said virtual gateway updates the protocol conversion information and the current status information in said knowledge base based on message traffic therethrough.

24. A communication server as defined in claim 23 wherein one of said networks is a wireless network and wherein another of said networks is a wired land-line network.

25. A communication server as defined in claim 24 wherein said virtual gateway unwraps headers accompanying incoming received messages and uses target logical connection information in the headers as keys to search said knowledge base for said protocol conversion information.

26. A communication server as defined in claim 25 wherein said virtual gateway analyzes the bodies of incoming messages for target logical connection information if the target logical connection information cannot be determined from the headers.

27. A communication server as defined in claim 23 wherein said registry stores a record for each registered physical device, said record comprising a physical device ID, an application ID, a virtual device ID and a physical ID to logical ID mapping.

28. A communication server as defined in claim 27 wherein each registered connection identification includes logical connection IDs, logical device IDs, virtual device IDs, and logical message and virtual device massage wrapping and unwrapping information.

29. A communication server acting as a gateway for the transmission of messages between two virtual devices communicating with networks implementing different protocols, said communication server comprising:
a knowledge base comprising a registry identifying each physical device registered to deliver messages for transmission between said virtual devices and through said gateway, a logical table identifying each registered connection available between physical devices and protocol conversion information required for each registered connection to convert messages of one protocol to a different protocol and a dynamic database identifying the current status of each actual connection between physical devices; and
a virtual gateway accessing said knowledge base upon receipt of a message, said virtual gateway initially searching said knowledge base for appropriate protocol conversion information using target logical connection information in a header of said message and if said search fails, searching said knowledge base for appropriate protocol conversion information using target logical convention information in a body of said message.

30. A communication server as defined in claim 29 wherein said registry stores a record for each registered physical device, said record comprising a physical device ID, an application ID, a virtual device ID and a physical ID to logical ID mapping.

31. A communication server as defined in claim 30 wherein each registered connection identification includes logical connection IDs, logical device IDs, virtual device IDs, and logical message and virtual device massage wrapping and unwrapping information.

32. A communication system comprising:
 a wireless network and a wired network over which communications between physical devices connected to said networks are to be carried, said wireless and wired networks implementing different protocols for messaging; and
 a communication server acting between said wireless and wired networks and through which messages transmitted between said wireless and wired networks pass, said communication server including a knowledge base storing information identifying each physical device registered in said communication system, information identifying registered connections available in said communication system including protocol conversion information for each registered connection where necessary and information identifying the status of each actual connection between physical devices in said communication system, said communication server accessing said knowledge base upon receipt of a message and searching said knowledge base for appropriate protocol conversion information, said communication server converting the protocol of a received message to a protocol compatible with the network to which said message is being sent using said protocol conversion information, wherein during said searching said communication server follows a multi-pass search procedure to locate said protocol conversion information, each pass of said procedure using a different portion of said message as a key to search said knowledge base for said protocol conversion information.

33. A communication system as defined in claim 32 wherein during a first pass of said procedure, a header of said message is used as said key and wherein during another pass of said procedure a body of said message is used as said key.

34. A communication system as defined in claim 33 wherein during a second pass of said procedure, a second header of said message is used as said key.

35. A communication system as defined in claim 33 wherein said communication server updates said knowledge base based on message traffic therethrough.

36. A communication system as defined in claim 32 wherein physical device identifications are stored in a registry of said knowledge base, wherein registered connection identifications and related protocol conversion information are stored in a logical table of said knowledge base and wherein actual connection status information is stored in a dynamic updatable database of said knowledge base.

37. A communication system as defined in claim 36 wherein said registry stores a record for each registered physical device, said record comprising a physical device ID, an application ID, a virtual device ID and a physical ID to logical ID mapping.

38. A communication system as defined in claim 37 wherein each registered connection identification includes logical connection IDs, logical device IDs, virtual device IDs, and logical message and virtual device massage wrapping and unwrapping information.

39. A communication server acting as a gateway for the transmission of messages between two virtual devices communicating with networks implementing different protocols, each message including a virtual device message header, a logical message header and a message body, said communication server comprising:
 a knowledge base storing information identifying each physical device registered in said communication system, information identifying registered connections available in said communication system including protocol conversion information for each registered connection where necessary to convert messages of one protocol to a different protocol and information identifying the status of each actual connection between physical devices in said communication system; and
 a virtual gateway accessing said knowledge base upon receipt of a message and searching said knowledge base for appropriate protocol conversion information initially using target logical connection information in a header of said message, and then using target logical connection information in said message body if the initial search fails.

40. A communication server as defined in claim 39 wherein said virtual gateway searches said knowledge base firstly using target logical connection information in said virtual device message header and then using target logical connection information in said logical message header if the search using the target logical connection information in said virtual device message header fails prior to using target logical connection information in said message body.

41. A communication system as defined in claim 40 wherein said communication server updates said knowledge base based on message traffic therethrough.

42. A communication server as defined in claim 39 wherein physical device identifications are stored in a registry of said knowledge base, wherein registered connection identifications and related protocol conversion information are stored in a logical table of said knowledge base and wherein actual connection status information is stored in a dynamic updatable database of said knowledge base.

43. A communication server as defined in claim 42 wherein said registry stores a record for each registered physical device, said record comprising a physical device ID, an application ID, virtual device ID and a physical ID to logical ID mapping.

44. A communication server as defined in claim 43 wherein each registered connection identification includes logical connection IDs, logical device IDs, virtual device IDs, and logical message and virtual device massage wrapping and unwrapping information.

* * * * *

UNITED STATES PATENT AND TRADEMARK OFFICE
CERTIFICATE OF CORRECTION

PATENT NO.    : 6,873,620 B1
DATED         : March 29, 2005
INVENTOR(S)   : Michael Coveley et al.

It is certified that error appears in the above-identified patent and that said Letters Patent is hereby corrected as shown below:

<u>Column 14,</u>
Line 53, delete "massage" and insert -- message --.

<u>Column 15,</u>
Line 25, delete "claims" and insert -- claim --.
Line 64, delete "massage" and insert -- message--.

<u>Column 16,</u>
Line 43, delete "massage" and insert -- message --.

<u>Column 17,</u>
Line 9, delete "massage" and insert -- message --.

<u>Column 18,</u>
Lines 6 and 58, delete "massage" and insert -- message --.

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,873,620 B1
DATED : March 29, 2005
INVENTOR(S) : Michael Coveley et al.

It is certified that error appears in the above-identified patent and that said Letters Patent is hereby corrected as shown below:

Column 14,
Line 53, delete "massage" and insert -- message --.

Column 15,
Line 25, delete "claims" and insert -- claim --.
Line 64, delete "massage" and insert -- message --.

Column 16,
Line 43, delete "massage" and insert -- message --.

Column 17,
Line 9, delete "massage" and insert -- message --.

Column 18,
Lines 6 and 58, delete "massage" and insert -- message --.

Signed and Sealed this

Seventh Day of June, 2005

JON W. DUDAS
*Director of the United States Patent and Trademark Office*